United States Patent [19]
Nystrom

[11] Patent Number: 5,979,703
[45] Date of Patent: Nov. 9, 1999

[54] MACHINE AND METHOD FOR MONITORING PRODUCT APPLICATION

[75] Inventor: Dwayne A. Nystrom, Chaska, Minn.

[73] Assignee: AG-Chem Equipment Co., Inc., Minnetonka, Minn.

[21] Appl. No.: 08/865,268

[22] Filed: May 29, 1997

[51] Int. Cl.[6] .................................................. B67D 5/08
[52] U.S. Cl. ............................ 222/58; 222/77; 222/608; 111/903; 356/72
[58] Field of Search ................................ 222/63, 58, 57, 222/608, 610, 613; 111/903, 200; 356/72

[56] References Cited

U.S. PATENT DOCUMENTS

| Re. 35,100 | 11/1995 | Monson et al. | 111/130 |
|---|---|---|---|
| 3,044,661 | 7/1962 | Cartwright | 222/25 |
| 3,129,844 | 4/1964 | Madison | 222/1 |
| 4,285,448 | 8/1981 | Group | 222/613 |
| 4,352,445 | 10/1982 | Cusumano et al. | 222/611 |
| 4,630,773 | 12/1986 | Ortlip | 239/1 |
| 4,878,598 | 11/1989 | Ruschhaupt, Jr. | 222/1 |
| 5,234,128 | 8/1993 | Hill | 222/63 |
| 5,301,848 | 4/1994 | Conrad et al. | 222/613 |
| 5,355,815 | 10/1994 | Monson | 111/200 |
| 5,453,924 | 9/1995 | Monson et al. | 364/131 |

*Primary Examiner*—Gregory L. Huson
*Attorney, Agent, or Firm*—Kinney & Lange

[57] ABSTRACT

A mobile products applicator includes a monitoring system particularly adaptable for use in selected product management applications, wherein application rates for selected products stored on-board one or more storage devices are measured on-the-go and visually reported to an applicator operator in near real-time. The mobile products applicator provides environmental advantages to all through enhanced resource management by eliminating or significantly reducing ground and/or water contamination.

13 Claims, 8 Drawing Sheets

MACHINE AND METHOD FOR MONITORING PRODUCT APPLICATION

BACKGROUND OF THE INVENTION

1. Field of the Invention

This present invention relates generally to mobile product applicator machines, and more particularly to a mobile product applicator machine having monitoring capability for measuring and reporting the output rate of selected products, e.g. waste products, being dispensed from the mobile product applicator machine.

2. Description of the Prior Art

Various mobile product applicator systems and associated methods of control have been suggested at one time or another, but in each instance, these systems leave something to be desired. For example, there is a need for a mobile product applicator machine that precisely and accurately measures and reports the amount of waste products being dispensed on-the-go and in near real-time from the applicator machine whenever the machine traverses a product delivery area. The waste products management industry has not yet recognized the necessity for providing feedback regarding the actual amount of waste products applied. This problem has been totally ignored by the waste products management industry because the focus of this industry has been concentrated on machines and methods to adjust and control the rate of waste product application in contradistinction with machines and information feedback methods to accurately measure and report the actual amount of waste products dispensed on-the-go in near real-time.

Numerous different types of mobile product applicator systems are available today. These systems may include a pull type unit (towed) or a self-propelled unit. Presently, these systems do not provide a means to measure the rate of product output on-the-go in near real-time. Some of these systems do provide a way to adjust the application rate by means of a gate or by changing the rpm of the power unit driving the product applicator. As stated above, they do not provide any feedback as to the actual amount of product applied on-the-go. Typically, the application rate is controlled by adjusting the ground speed of the applicator and adjusting another variable such as gate height in order to apply a given amount of product over a specified area, Such an approach is time consuming and it requires some trial and error in order to determine the proper settings of the numerous variables involved (gate height, conveyor speed or others). It also results in application rates that are above or below the target rate. If these rates are too high due to mistakes in the machine settings, problems such as water and/or ground contamination may result.

U.S. Pat. No. 5,085,372, issued Feb. 4, 1992, to Martin, entitled Manure Spreaders, discloses one such waste (manure) spreader that uses a gate mechanism to control the rate of product application through a trial and error process. Similarly, U.S. Pat. No. 5,386,943, issued Feb. 7, 1995, to Peeters, entitled All Purpose V-ShapedManure Spreader and U.S. Pat. No. 3,876,055, issued Apr. 8, 1975, entitled Farm Waste Material Handler, disclose waste product applicator machines that use a trial and error process to control the product application rate.

Machines and associated methods of accurately controlling the rate of product application have been developed. However, these machines and methods still lack the desirable operator feedback allowing the machine operator to have knowledge of actual waste product application rates measured on-the-go. U.S. Pat. No. 5,301,848, issued Apr. 12, 1994, to Conrad et al., entitled Electromagnetic Meter For Closed Dispensing Container discloses a metering device for controlling the flow rate of granular material through a conduit. U.S. Pat. No. 5,234,128, issued Aug. 10, 1993, to Hill, entitled Aggregate Material Spreader, discloses a material spreader attached to a motor vehicle that receives and dispenses an aggregate material in predetermined quantities. U.S. Pat. No. 4,878,598, issued Nov. 7, 1989, to Ruschhaupt, Jr., entitled Method And Apparatusfor Dispensing A Substance To A Work Area, discloses a method and apparatus for dispensing a substance using a trial and error procedure. U.S. Pat. No. 4,352,445, issued Oct. 5, 1982, to Cusumano et al., entitled Building Material Applicator, discloses an applicator for introducing and spreading building material in a controlled manner using a metering device.

Still needed, but not available with mobile product applicator machines presently known in the art is a waste product applicator having an integral system to measure and report in near real-time, the discharge rate of waste product and which provides the operator instant feedback via a display or other like mechanism of the actual amount of product applied on-the-go. This data could then be used by the operator to determine the actual waste product application rate.

Modern mobile product applicator machine control systems typically have a host controller located within the operator cab of the machine, including a processor with associated input and output devices. The host is generally directly linked to at least one other controller which may also be located within the cab, and which is responsible for all communication to devices on the machine, such as shown in U.S. Pat. No. 4,630,773, issued Dec. 23, 1986, to Ortlip, entitled Method and Apparatusfor Spreading Fertilizer, and U.S. Pat. No. Re 35, 100, issued Nov. 28, 1995, to Monson et al., entitled Variable Rate Application System, both assigned to Ag-Chem Equipment Company, Inc. of Minnetonka, Minn., the Assignee of the present invention. The system disclosed in the '100 reissue patent comprises a controller accessing a soil map indicating a soil characteristic for each portion of the field. Field locations and status maps indicating current crop input level at various locations in a field to be treated are monitored by a control system. A crop input map is updated after a dispensing pass to provide a status record. Position locators for the machine in the field may include "Dead Reckoning", GPS, or LORAN systems, for example.

U.S. Pat. No. 5,355,815 discloses yet another closed-loop variable rate applicator system. The system operates by determining a soil prescription in near real-time and dispenses crop inputs to the soil scene as a fraction of the soil prescription. The '815 patent is also assigned to Ag-Chem Equipment Company, Inc. and is incorporated herein by reference in its entirety.

Another system is disclosed in U.S. Pat. No. 5,453,924, issued Sep. 26, 1995, to Monson et al., entitled Mobile Control System Responsive To Land Area Maps. This system expands on earlier known applicator machine controls systems including those heretofore assigned to Ag-Chem Equipment Company, Inc., by incorporating a network scheme which links a host controller positioned within the operator cab to multiple controllers located at various points on the machine external to the operator cab. All of the above patents are assigned to the Assignee of the present invention and are incorporated by reference in their entirety herein. The control systems referenced herein above describe systems which, when properly configured with the present inventive algorithmic software and associated sensors and feedback devices, may be adapted to practice the present invention.

SUMMARY OF THE INVENTION

The limitations of the background art discussed herein above are overcome by the present invention which includes a mobile product applicator monitoring system that is configurable for use on applicator machines such as waste applicators. As used herein, the term waste applicator includes, but is not limited to any self-propelled or towed fertilizer, e.g. manure applicators, chemical applicators and any combinations thereof. The present inventive mobile product applicator system addresses the problems associated with the unaccounted for effects of misapplied products, e.g. waste products, which result from use of certain known pre-calibrated and trial and error procedures to control the amount of products dispensed from a mobile product applicator machine. Presently known mobile product applicators such as waste applicator systems are limited by their structures and methods to control of product application rates via pre-calibrated and/or trial and error techniques that do not measure and report actual amounts of products applied on-the-go. In contrast, the present mobile products applicator system is a system that is customized to accurately and precisely measure and report the actual amount of applied products, e.g. manure, fertilizer, being dispensed by the application machine, on-the-go. The novel products applicator system is not limited to application of waste products, however, but will function with any one or more products that can be delivered satisfactorily via a mobile product applicator machine. A host computer system is provided that is responsive to machine sensor devices, e.g. load cells and speed sensors, for determining the actual amount of products being dispensed on-the-go at each dispensing point as the product applicator machine traverses a geographic area. The increased awareness of actual product application rates, e.g. waste products, by the machine operator allows the operator to quickly and easily adjust the application rate up or down, resulting in significant environmental advantages and gains by all as a consequence of reduced water and ground contamination and the like. As used herein, ground-speed or machine speed means machine velocity. Product release point means the actual point where a stored product is discharged from a product storage device via a product metering device. Product dispensing point means the actual point where a product is discharged from the mobile product application machine.

The present inventive mobile product applicator system therefore provides a vast improvement over product application systems known in the art which use pre-calibrated devices and trial and error methods to control application rates of products. The aforesaid improvement is the result of providing a system, as stated herein before, in which the applicator machine is customized with its own unique sensors as well as algorithmic software, thereby ensuring that on-the-go measurement of actual product application rates are available for use in near real-time by the machine operator. The novel mobile product applicator system has a data processor that is responsive to sensor devices for determining the amount of products dispensed at each dispensing point on-the-go. A feedback system conveys this information to a machine operator on-the-go via a display apparatus, allowing the operator to make timely adjustments to vary the rate of products being dispensed on-the-go.

In one aspect of the present invention, the construction and arrangement is employed wherein a mobile product applicator machine includes a hopper which has an apron or like means on the bottom of the hopper to move the stored product to a discharge mechanism. This applicator machine also has a vertical gate that is located in front of the discharge mechanism. The amount of product applied can be calculated by determining the volume of stored product that will fit through the opening made by the hopper sides, bottom, and gate. Each gate height will correspond to a specific volume. This volume, together with the speed of the apron will provide on-the-go discharge rate data which can be used by the machine operator to control the rate of product discharge. Such a construction and arrangement, familiar to those skilled in the art, can be combined with the present inventive apparatus and method to improve the aforesaid product applicator machine thereby allowing measurement and reporting of actual product delivery rates on-the-go in near real-time.

In yet another aspect of the present invention, the construction and arrangement is employed wherein a mobile product applicator machine includes a hopper having one or more augers in the bottom of the hopper which are used to move the stored product to the discharge mechanism. The amount of product applied on-the-go can be controlled simply by knowing the amount of product the auger(s) move per unit time. Although this construction and arrangement is also familiar to those skilled in the art, it can be combined with the present inventive apparatus and method to improve the aforesaid mobile product applicator machine to enable on-the-go measurement and reporting of actual product delivery rates in near real-time.

Still another aspect of the present invention employs a construction and arrangement utilizing one or more sensors to monitor the distribution of the discharged product. The type of hopper and discharge mechanism are not critical when using this approach. A sensor can be placed under the discharge of product and would measure, e.g. weigh, the amount of product that falls on it over time. An alternate type of sensor could use a particular type of visual recognition, e.g. electric eye. These arrangements and construction of the present invention are similar to a yield monitor in a combine, but produce a measure of product rate exiting the machine rather than a measure of product rate entering the machine.

Another aspect of the present invention employs a construction and arrangement utilizing level sensor(s) installed in a product storage hopper. These sensors could be used to determine a change in volume over time. Knowing the density of the stored product allows for accurate and precise calculation of weight change per unit time via a data processor to find the rate of product discharge. This information can then be conveyed to the machine operator on a computer display or other like device. The particular sensors employed can be mechanical, electrical, or a combination of both types.

Still another aspect of the present invention employs a construction and arrangement that utilizes a hopper mounted upon load cells. The applicator design itself is not important in such a construction and arrangement. Using the load cells allows a data processor to determine a difference in the weight of the hopper over time, and therefore an accurate and precise measurement of the rate of product discharged from the machine as the machine traverses a geographical area. This construction and arrangement eliminates inconsistencies in actual measurement data that might otherwise be inherent with machines that are affected by changes in material densities or consistencies.

A feature of the present invention is the provision of a mobile product applicator that results in environmental gains for all due to reduced or elimination of water and ground contamination as a consequence of on-the-go operator feedback of discharge rate allowing the operator to quickly remedy inadvertent and/or misapplication of discharged products.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION OF THE PREFERRED EMBODIMENTS

Figure 1:
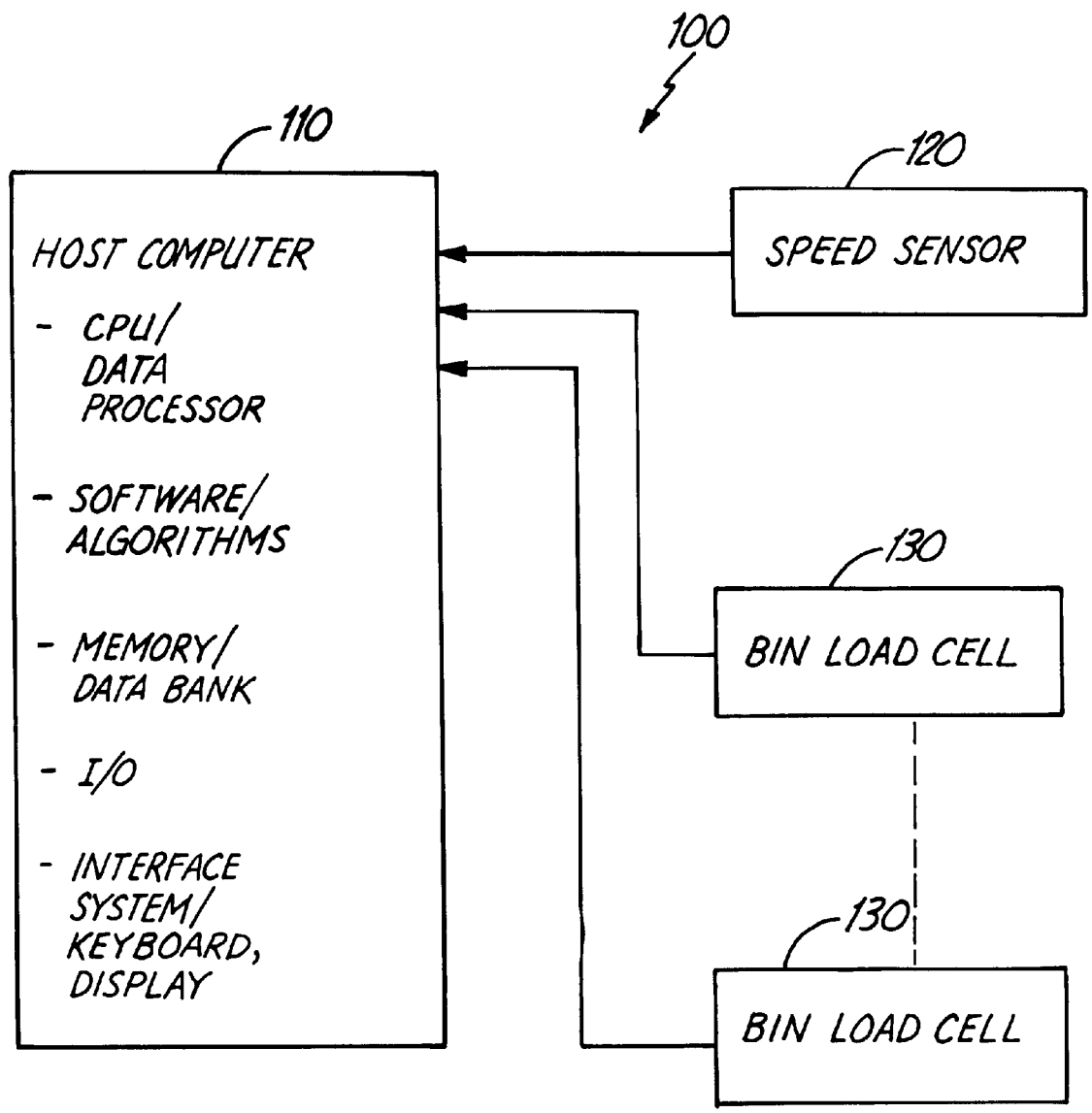
FIG. 1 is a simplified block diagram illustrating one embodiment of a mobile product applicator in accordance with the present invention having monitoring apparatus suitable for measuring product application rates on-the-go and reporting the results to the applicator machine operator in near real-time.

The preferred embodiments described as follows, address the long felt need by those in the mobile products applicator industry to provide a mobile product application machine capable of accurately and precisely monitoring and reporting the actual rate of product application on-the-go in near real-time as the mobile product applicator machine traverses a geographic area. In accordance with one preferred embodiment of the present invention, and with particular attention being directed to FIG. 1, a simplified block diagram illustrates a mobile product applicator monitoring apparatus 100 suitable for measuring product application rates on-the-go and reporting the results to the applicator machine operator in near real-time. The monitoring apparatus 100 can be seen to have a host computer system 110 that accepts input data on-the-go from a vehicle speed sensor 120 and one or more product storage bin load cells 130. Heretofore, known product applicators have been limited to applications which control the rate of application via apparatus and methods familiar to those skilled in the art. For example, it has been widely accepted in the waste product application industry, that use of calibrated control apparatus will adequately and effectively eliminate waste product spreading inaccuracies. The present inventor has found however, that product spreading inaccuracies are often unavoidable, especially when spreading or dispensing products with applicator machines thereof having no means for measuring and reporting the actual rate of product application on-the-go. It is anticipated by the present inventors that recognition and appreciation of the aforesaid ground and water contamination problems will become a more sensitive issue as more intense evaluations by those skilled in the art are consummated. With continued reference to FIG. 1, the product applicator monitoring and reporting apparatus host computer 10 can be seen to have a data processor, a data input device such as a keyboard, data storage devices such as a memory unit, input and output ports, a display, and algorithmic software directing the data processor. The present invention is not so limited however, and it will readily be appreciated by those skilled in the computer art that other peripheral devices such as instrumentation amplifiers, analog/digital converters, network driver devices, and the like are often required in such specialized computer systems. These devices are well known in the art and therefore are not illustrated herein to preserve simplicity and brevity. The monitoring apparatus 100 also may have incorporated therein, metering devices including, but not necessarily limited to product storage bin release point sensors, product flow meters and sensors, and/or dispensing point meters and sensors. These different types of metering devices can be used to control the product flow rates at different points on a mobile product applicator machine to vary selected product application rates if so desired, until the desired application rates are achieved as measured and reported to the machine operator via the monitoring and reporting apparatus 100.

Figure 2:
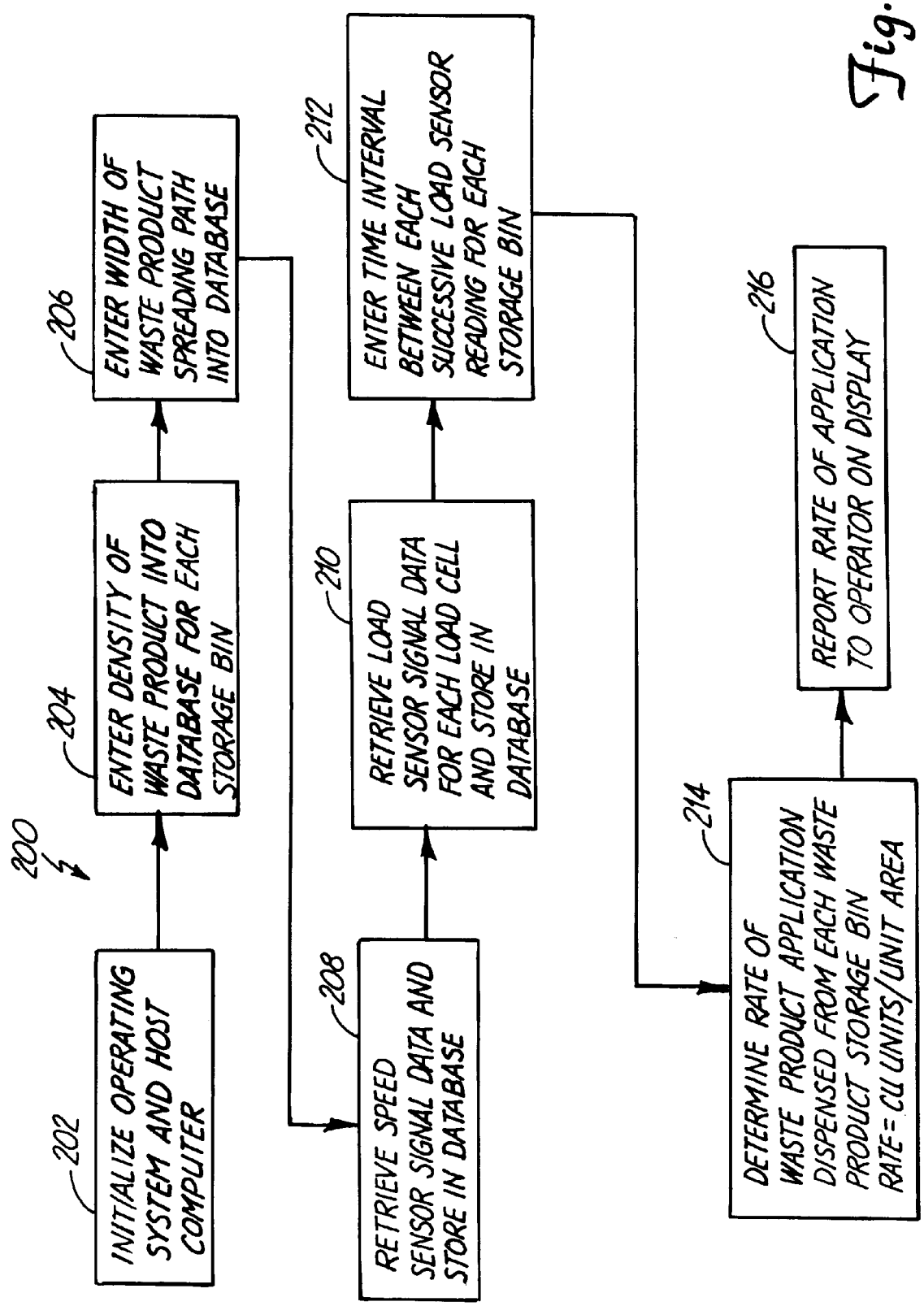
FIG. 2 is a simplified flow chart illustrating one embodiment of algorithmic software in accordance with the present invention, suitable for determining waste product application rates on-the-go and suitable for use with the mobile product applicator monitoring apparatus depicted in FIG. 1.

FIG. 2 is a simplified flow chart illustrating one embodiment of an algorithmic software 200 suitable for determining waste product application rates on-the-go and further suitable for use with the mobile product applicator monitoring and reporting apparatus 100 depicted in FIG. 1. As stated herein above, the present invention is not so limited however. For example, the present inventive mobile product applicator monitoring and reporting apparatus 100 can be used for measuring and reporting product delivery rates for any product or combination of products that is suitably stored and dispensed via a towed or self-propelled vehicle or machine. The monitoring apparatus 100 is activated first by booting-up or initializing the host computer system 110 as shown in block 202.

Certain data is entered into a database by the machine operator while other data is retrieved and stored in the database via the host computer system 110, as discussed herein below. For example, the waste product density of each stored waste product in entered into the database as shown in block 204, via a keyboard interface, keypad interface, or other like device. Numerical data representative of the fixed width of the waste product spreading path produced by the mobile waste applicator machine 100 is also entered into the database as shown in block 206, via the machine operator keyboard or input device. When the mobile waste applicator machine 100 is moving at a fixed speed and simultaneously dispensing a stored waste product upon the ground, the host computer system 110 operates to retrieve a signal from the speed sensor 120 representative of the vehicle speed as shown in block 208. The resulting speed data is also stored in the database as shown in block 208. During the waste product application process, each load cell 130 functions to produce a signal indicative of the current weight of its respective waste product storage bin as the waste product is being metered from the bin. The host computer system 110 operates to sample each load cell 130 signal at a predetermined sampling rate. This load cell 130 data is retrieved for each active load cell 130 and is subsequently stored in the database via the host computer system 110 as shown in block 210. The computer system 110 also functions to determine time interval data that is dependent upon the aforesaid sampling rate as well as any additional predetermined measurement cycles used by the algorithmic software 200. This time interval data and/or any time interval entered by the machine operator via the keyboard or input device, is transferred into the database as shown in block 212. Using the known waste product density data, the waste product spreading path width data, the applicator machine speed data, the current load cell data, and the aforesaid time interval data, the algorithmic software 200 then operates in combination with the monitoring apparatus 100 to determine the current rate of waste product application, e.g. volume units per area units, as shown in block 214. This application rate data is then displayed to the machine operator on a display in near real-time as shown in block 216. The display is generally positioned near the host computer system 110 within the machine operator cab.

The present mobile product applicator monitoring system 100 can easily be customized to work with any one or more product application machines, powered or towed, including combinations thereof, using either manual or automatic data entry. It will readily be appreciated that any mobile product application machine may have its own system of electronics, hydraulics and control mechanisms which may be unique unto itself or common to a family of such application machines. The present inventive monitoring system 100 and method takes these machine characteristics into consideration to reconfigure and adapt the necessary electronics, hydraulics and control mechanisms to ensure accurate measurements and reporting of selected product application rates are achieved on-the-go in near real-time, thereby elevating state of the art mobile product applicator technology to a higher level.

Figure 3:
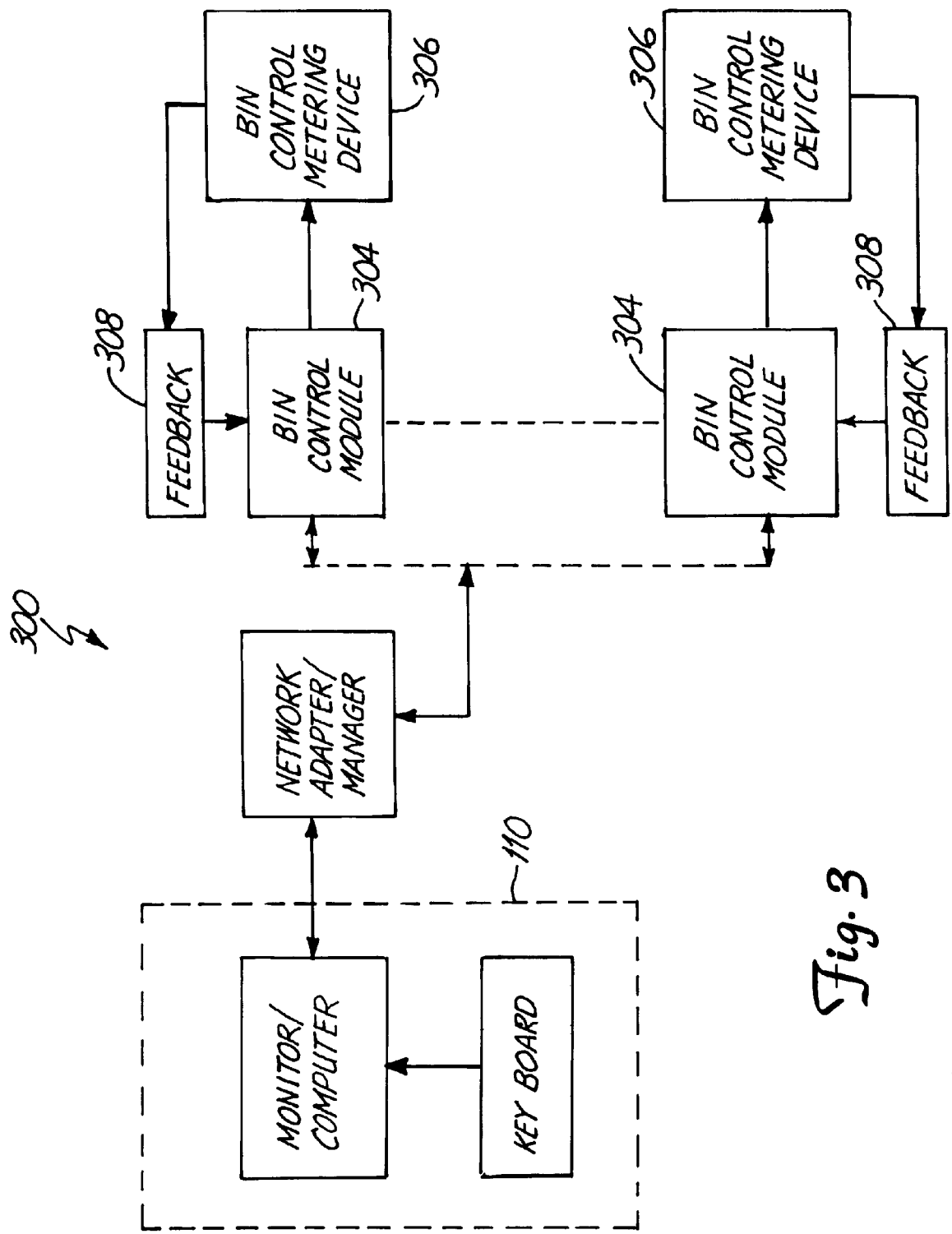
FIG. 3 is a simplified block diagram illustrating a FALCON® variable rate product application machine control system which may be adapted for use with the present mobile product applicator monitoring and reporting apparatus depicted in FIG. 1 as well as the algorithmic software depicted in FIG. 2.

With reference now to FIG. 3, a simplified block diagram illustrates a product applicator control system 300 known as FALCON® available from Ag-Chem Equipment Co., Inc. of Minnetonka, Minn., that has a cab mounted host computer system 110, and that can be reconfigured and adapted with the appropriate algorithmic software 200, load cells 130 and speed sensors 120 to measure and report waste product application rates on-the-go in near real-time in accordance with one embodiment of the present invention. Using this on-the-go application data, the machine operator can then instruct the host computer system 110 to prompt individual control modules 304 to interrogate metering devices 306 such as waste product storage bin pumps, dispensers and/or discharge mechanisms associated with that particular control module 304 via a feedback network 308. The host computer system 110 can then interface with appropriate control modules 304 via an RS232 network or the like to individually vary the desired waste product dispensing rate for each waste product stored on the machine.

Figure 4:
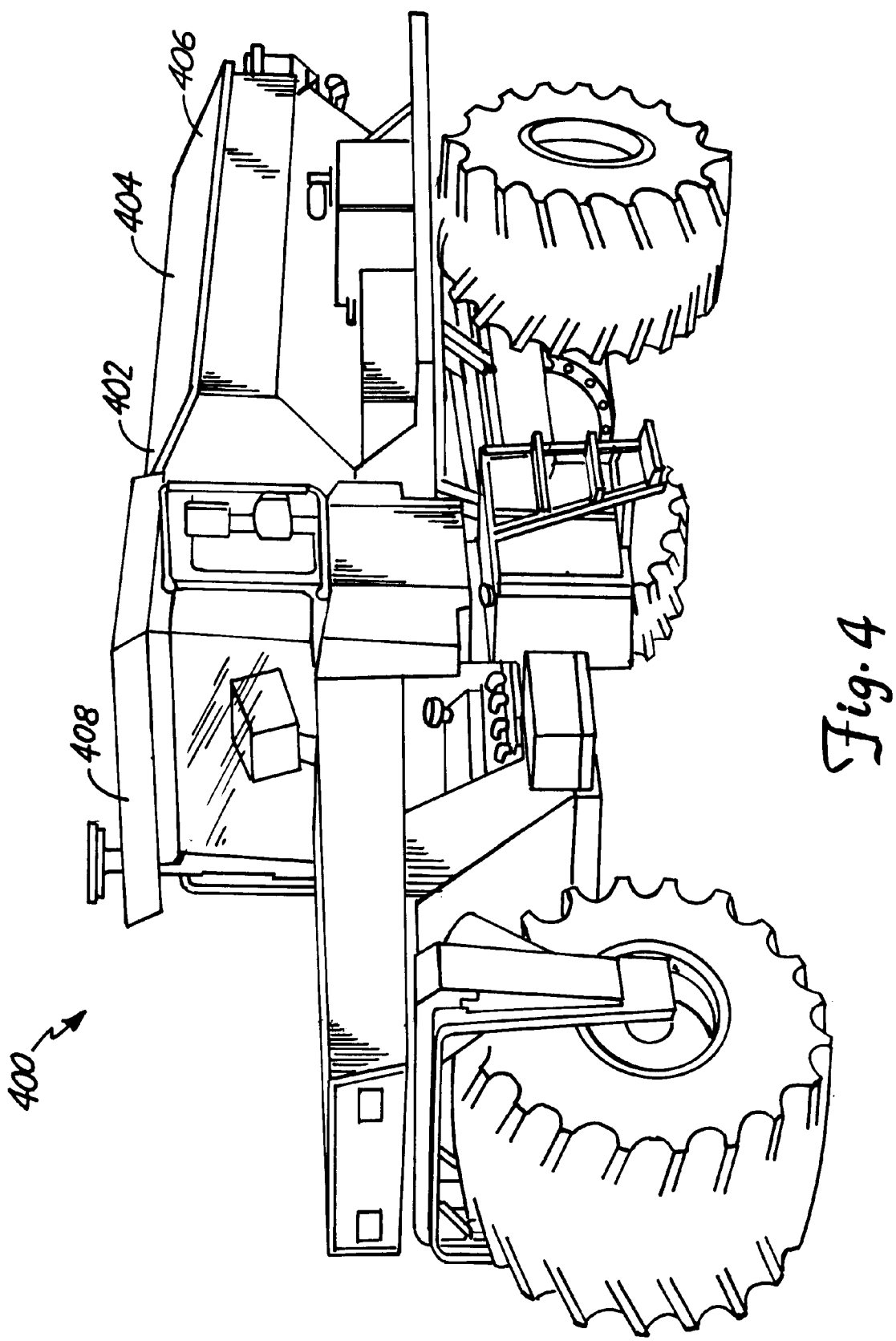
FIG. 4 is a perspective view of a mobile product application machine adapted to include the mobile product applicator monitoring and reporting apparatus depicted in FIG. 1 as well as the algorithmic software depicted in FIG. 2.
Figure 5:
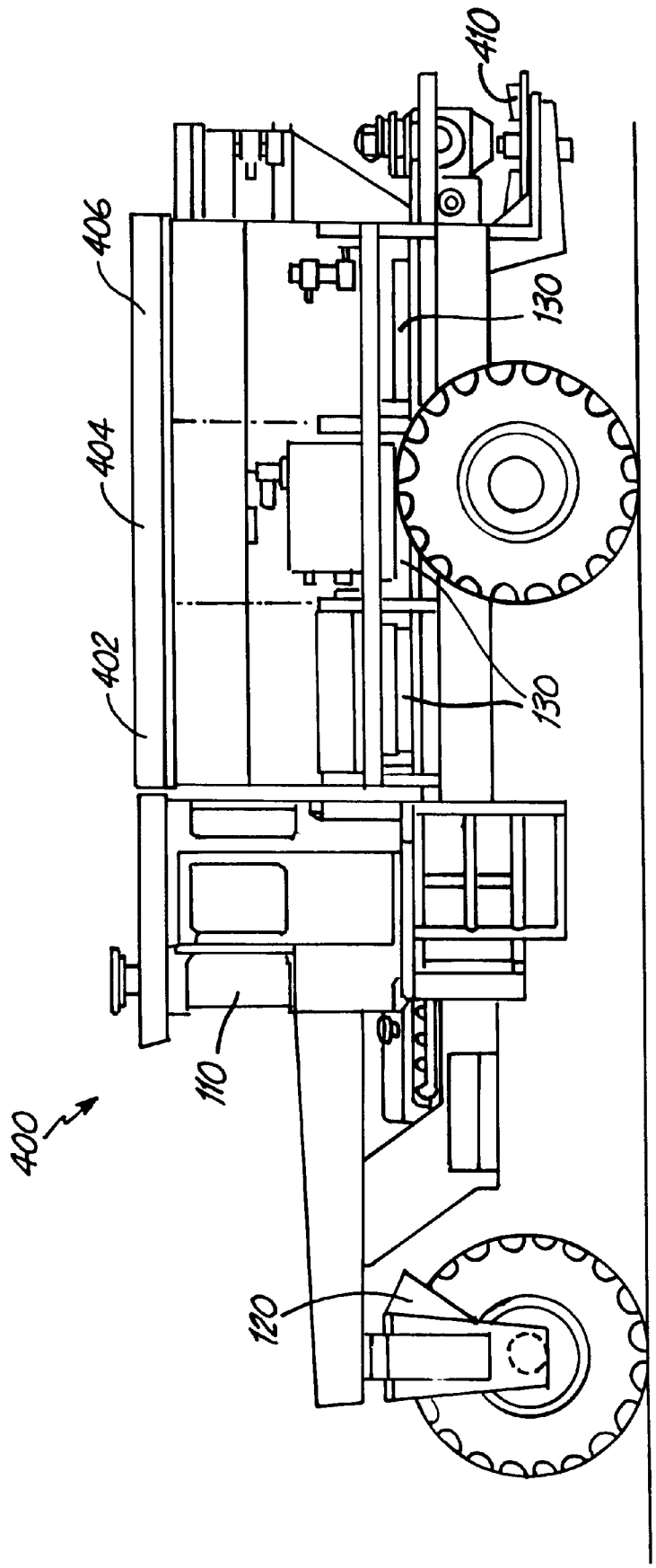
FIG. 5 is a side elevation view of the mobile product application machine depicted in FIG. 4.

A mobile product application machine 400 having multiple product storage bins 402, 404, 406 is illustrated in FIG. 4. Such machines are compatible for use with the mobile product applicator monitoring apparatus 100 and associated algorithmic software 300 discussed herein above. Generally, the host computer system 110 is used in combination with a monitor such as a CRT which is located within the operator cab 408 for use by a machine operator to move the machine 400 over a desired product spreading area. A more detailed side view of the product application machine 400 is depicted in FIG. 5. Preferably, the mobile product applicator machine 400 illustrated includes interconnecting devices which allow the application machine 400 to switch back and forth between desired bins 402, 404, 406 storing the same or different type products during the spreading process. Product applicator machines such as the one depicted in FIGS. 4 and 5 have not yet been configured and adapted by those skilled in the art to measure and visually report product application rates on-the-go in near real-time. Such product applicator machines have historically been limited in their use to control the rate of product application using trial and error methods and/or pre-calibrated apparatus and techniques in contradistinction with application rate measurement and reporting uses. None of the known applicator machines incorporate structures and/or methods even remotely similar to the present mobile product applicator monitoring apparatus 100 including a speed sensor 120 in combination with load cells 130 and associated algorithmic software 200 discussed herein above to measure and report in near real-time the application rate of selected products being dispensed on-the-go by the applicator machine 400. It will readily be appreciated that the present invention is not limited to the use of speed sensors and/or load cells however, so long as the novel functionality, e.g. measuring and visually reporting product application rates on-the-go in near real time, is maintained. The applicator machine 400 can be seen to have a spreading device 410 operatively mounted on the machine 400. The present invention is not so limited however, and it will be appreciated that many other types of product spreading devices can also be used to accomplish spreading a selected product or combination of stored products so long as the width of the product path can be accurately determined for use by the algorithmic software 200. The present invention thus provides a system and method of customizing a mobile product applicator machine, powered or towed, to enable accurate and precise monitoring of product application rates on-the-go in near real-time.

Figure 6:
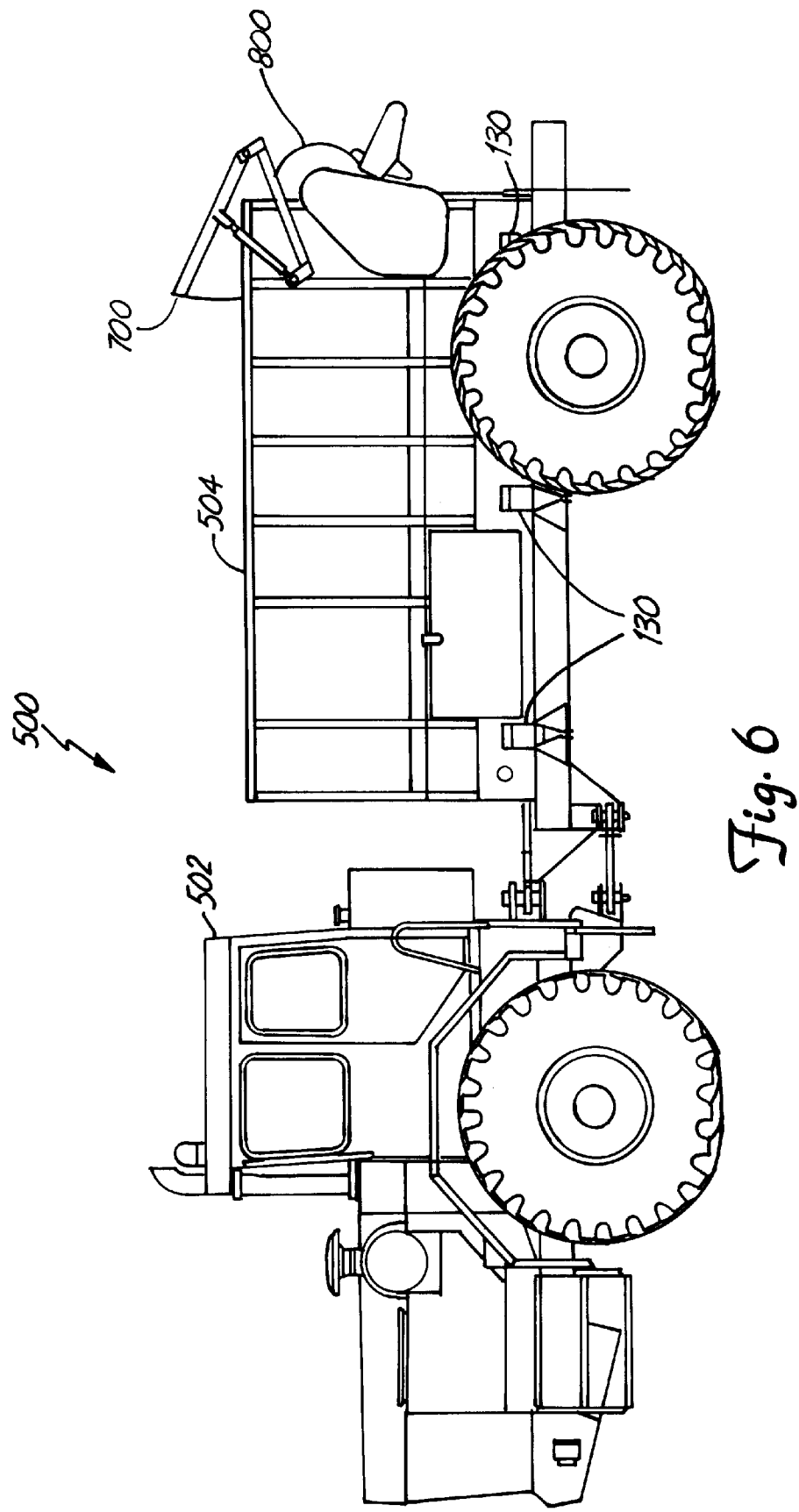
FIG. 6 is a side elevational view of a mobile waste product applicator machine configured with the mobile product applicator monitoring and reporting apparatus depicted in FIG. 1 as well as the algorithmic software depicted in FIG. 2.

FIG. 6 is a side elevational view of a typical mobile waste product applicator machine 500 that can be configured with the mobile product applicator monitoring and reporting apparatus 100 depicted in FIG. 1 as well as the algorithmic software 200 depicted in FIG. 2. The mobile waste product applicator machine 500 includes a self-propelled vehicle 502 with a mounted waste product storage bin or hopper 504. The machine 500 illustrated is a typical structure familiar to those in the waste product spreading industry and is representative of only a single embodiment that can be used in combination with the present invention as stated herein before.

Figure 7:
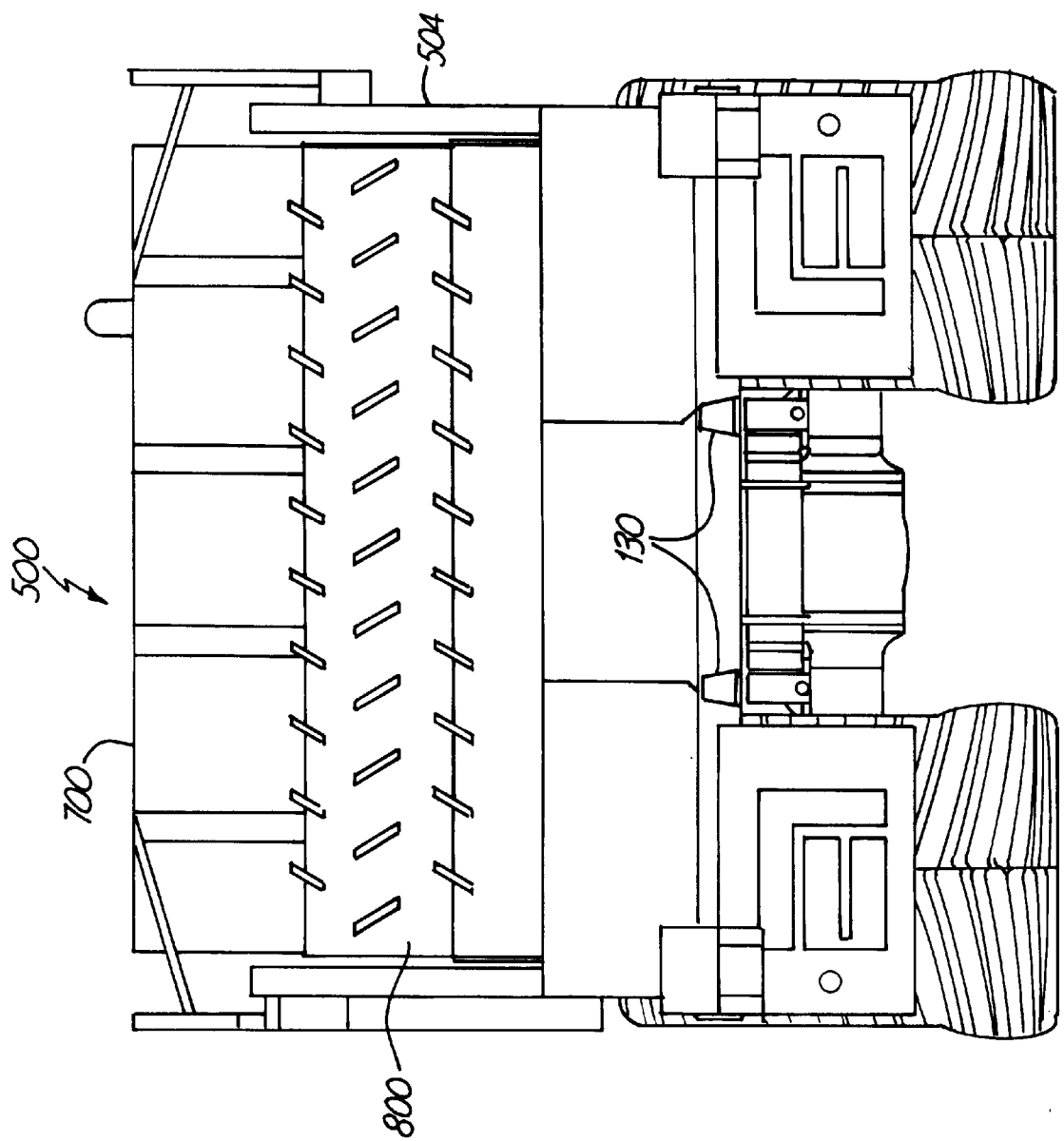
FIG. 7 is a rear elevational view of the mobile waste product applicator machine illustrated in FIG. 6.

FIG. 7 is a rear elevational view of the mobile waste product applicator machine 500 depicted in FIG. 6. The waste product applicator machine 500 is shown configured to utilize a hopper 504 mounted upon one or more load cells 130 in conformance with one preferred embodiment of the present invention. The applicator design itself is not important in such a construction and arrangement. Using the load cells 130 allows a data processor to determine a difference in the weight of the hopper 504 over time, and therefore an accurate and precise measurement of the rate of waste product discharged from the machine 500 as the machine 500 traverses a geographical area. This construction and arrangement eliminates inconsistencies in actual measurement data that might otherwise be inherent with machines that are affected by changes in material densities or consistencies. This waste applicator machine 500 also has a vertical gate 700 that is located in front of a discharge mechanism 800 depicted in FIG. 6. In a manner familiar to those skilled in the art, the amount of waste product applied can be calculated by determining the volume of stored product that will fit through the opening made between the hopper 504 and the gate 700. Each gate height will correspond to a specific volume. This volume data, together with the speed of the apron conveyor or other like device, can be used by the machine operator to control the rate of waste product discharge.

Looking again at FIG. 7, the discharge mechanism 800, e.g. beater, tined roll, etc., familiar to those skilled in the art, is used to distribute the stored product discharged through the gate 700 orifice to accommodate a calculated product delivery rate. Such a construction and arrangement, known to those skilled in the art for achieving some control in the actual product delivery rate, can be combined with the present inventive apparatus and method to improve the aforesaid waste product applicator machine such that measurement and visual reporting of the actual product delivery rates on-the-go in near real-time are also achievable.

Figure 8:
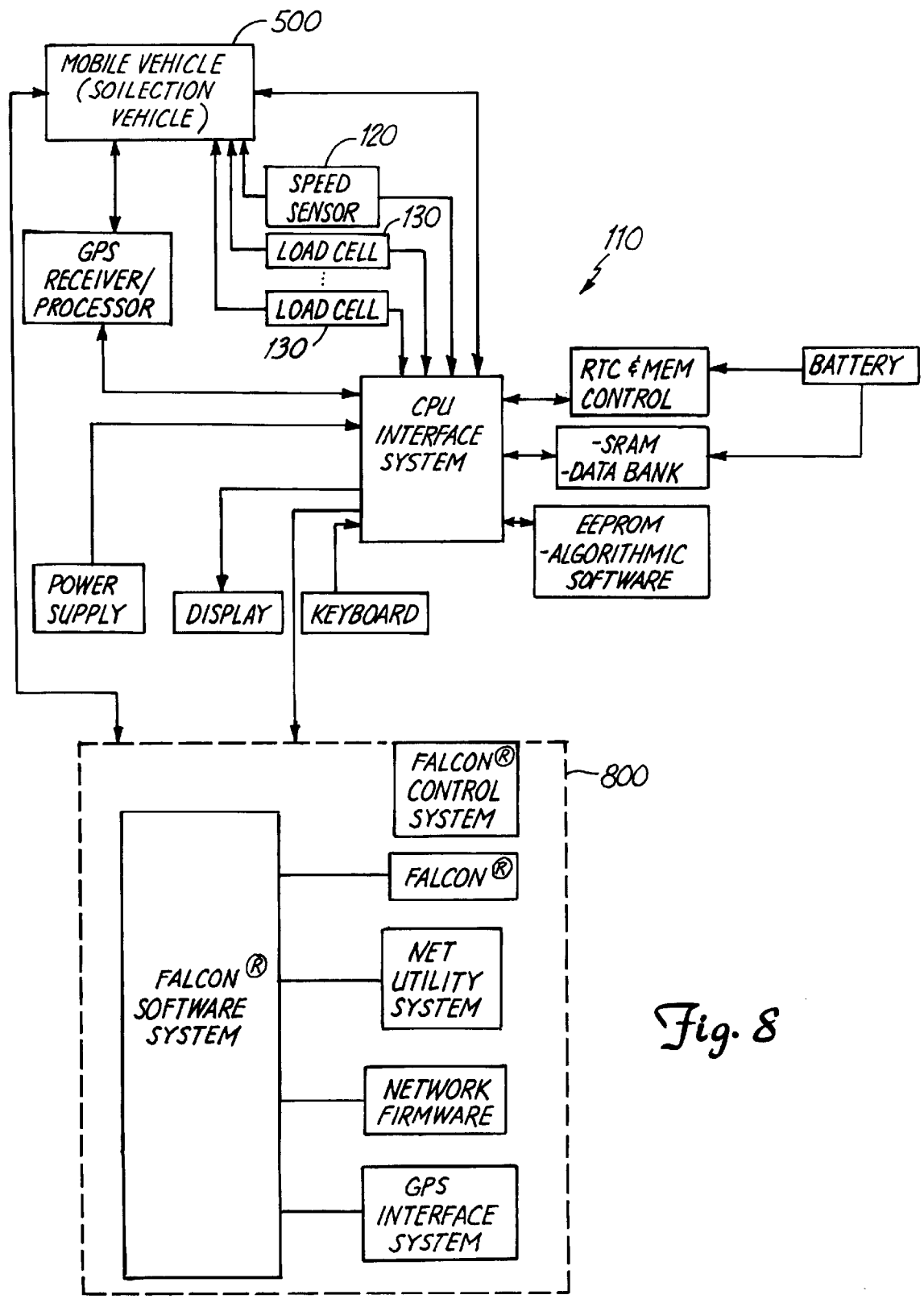
FIG. 8 is a more detailed block diagram of the mobile product applicator illustrated in FIG. 1.

FIG. 8 is a more detailed block diagram of the mobile product applicator illustrated in FIGS. 1 and 3 further depicting interfacing between a FALCON® controller 800, a mobile vehicle 500, e.g. SOILECTION® vehicle, and a host computer system 110 to form one embodiment of the present machine for monitoring mobile product application in accordance with the present invention.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. Further it provides for a more environmentally desirable approach to waste management by eliminating or significantly reducing ground and/or water contamination in a field. However, while a particular embodiment of the present invention has been described herein in detail, it is to be understood that various alterations, modifications and substitutions can be made therein without departing from the spirit and scope of the present invention, as defined in the claims which follow. For example, an on-the-go waste product applicator rate is not easily monitored using current applicators because the proper data is not supplied to the operator. Some of these current applicators can be re-configured and adapted in numerous ways to measure and visually report such data on-the-go in near real-time in conformance with the present invention. It is noteworthy that presently, none of these ways are being reconfigured or otherwise adapted for measuring and visually reporting the aforesaid product application rate. Furthermore, the present inventive applicator is not limited to applicators that measure application rates for waste products, but is easily configured to measure and report application rates on-the-go in near real-time for any product or combination of products dispensed via a towed and/or self-propelled vehicle.

I claim:
1. A mobile product applicator comprising:
a machine having at least one product storage device;
at least one load cell operatively coupled to each said at least one product storage device;
at least one speed sensor operatively coupled to said machine; and
a monitoring system in communication with said machine, said monitoring system including:
    a data processor;
    a data input device in communication with said data processor;
    a visual display device controlled by said data processor;
    an algorithmic software directing said data processor; and
    a data storage unit, wherein discrete said speed sensor data, load cell data, time interval data, product density data, and spreading path data associated with said machine is stored and supplied to said data processor such that said data processor, directed by said algorithmic software, can automatically determine discrete product application rate data for selected products using algorithmically defined interrelationships between said discrete speed sensor data, said load cell data, said time interval data, said product density data, and said spreading path data and such that said product application rate data is visually reported through the visual display device to a mobile applicator operator on-the-go in near real-time.

2. The mobile applicator of claim 1 wherein said machine is self-propelled.

3. The mobile applicator of claim 1 wherein said machine is equipped for towing.

4. A mobile product applicator, the applicator comprising:
at least one applicator machine; and
a monitoring system in communication with said at least one applicator machine, said monitoring system including:
    a visual display device;
    at least one speed sensor operatively coupled to said machine;
    at least one volumetric flow sensor operatively coupled to said machine;
    a data processor;
    a data input device in communication with said data processor;
    an algorithmic software directing said data processor; and
    a data storage unit, wherein discrete applicator speed data, product volumetric flow data, time interval data, and spreading path data associated with a selected machine is stored and supplied to said data processor such that said data processor, directed by said algorithmic software, can automatically determine discrete product application rate data for selected products using algorithmically defined interrelationships between said discrete applicator speed data, said time interval data, said product volumetric flow data, and said spreading path data such that said product application rate data is visually reported through the visual display device to a mobile product applicator operator on-the-go in near real-time.

5. The mobile applicator of claim 4 wherein said at least one machine is self-propelled.

6. The mobile applicator of claim 4 wherein said at least one machine is equipped for towing.

7. A mobile product applicator, the applicator comprising:
at least one applicator machine, said at least one applicator machine having at least one product storage device;
means operatively coupled to said at least one applicator machine for measuring volumetric flow of selected products; and
a monitoring system in communication with said at least one applicator machine, said monitoring system including:
data processing means for processing discrete data associated with mobile applicator speed, applicator machine spreading path width, predetermined timing intervals and said volumetric flow of selected products;
data entering means in communication with said data processing means;
an algorithmic software directing said data processing means;
data storing means, wherein said discrete data is stored and supplied to said data processing means such that said data processing means, directed by said algorithmic software, can automatically determine product application rate data for selected products using said discrete data and algorithmically defined interrelationships between said data; and
a visual display device controlled by the data processing means which visually reports said product application rate data to a mobile applicator operator on-the-go in near real-time.

8. The mobile applicator of claim 7 wherein said at least one machine is self-propelled.

9. The mobile applicator of claim 7 wherein said at least one machine is equipped for towing.

10. A mobile product applicator having a visual display device, said applicator comprising:
a machine having at least one product storage device;
at least one load cell operatively coupled to each said at least one product storage device;
at least one speed sensor operatively coupled to said machine; and
a computer system in communication with said machine, said computer system including:
a central processing unit, an input and output capability, and a memory capability;
a software system directing said computer system; and
a system interface, said computer system under a direction of said software system being in communication with said interface system, wherein said visual display device is accessed through said interface system such that discrete product application rate data for selected products determined from algorithmically defined interrelationships between discrete speed sensor data, load cell data, time interval data, product density data, and spreading path data input into said computer system via said input and output capability, is visually reported to a mobile applicator operator on-the-go in near real-time.

11. A mobile product applicator for visually reporting selected product application rate data said applicator comprising:
means for determining and storing speed sensor data, load cell data, time interval data, product density data, and spreading path data;
means for accessing said speed sensor data, load cell data, time interval data, product density data, and spreading path data;
means for extracting selected data points from said speed sensor data, load cell data, time interval data, product density data, and spreading path data;
means for creating selected product application rate data based upon said selected data points; and
means for visually reporting said application rate data to a mobile product applicator operator on-the-go in near real-time.

12. The mobile product applicator of claim 11 wherein said means for extracting comprises a software system having algorithmic steps directing said computer system.

13. The mobile product applicator of claim 12 wherein said means for creating selected product application rate data comprises means for interpolation, extrapolation, interpretation, modeling and combinations thereof of to expand said data points.

* * * * *